July 24, 1934.  J. J. JAZWIECK  1,967,618
GAUGE
Filed July 26, 1932

Inventor
Joseph J. Jazwieck
By Clarence A. O'Brien
Attorney

Patented July 24, 1934

1,967,618

UNITED STATES PATENT OFFICE 1,967,618

GAUGE

Joseph J. Jazwieck, Columbus, Nebr.

Application July 26, 1932, Serial No. 624,831

1 Claim. (Cl. 33—148)

The present invention relates to new and useful improvements in gauges and is intended particularly for use by automobile mechanics and has for some of its objects to provide, in a manner as hereinafter set forth, an instrument of this character which will be simple in construction, strong, durable, accurate, compact, and which may be manufactured at low cost.

Another important object of the invention is to provide a gauge of the character described which may be accurately adjusted and which may be used for either inside or outside work.

All of the foregoing and still further objects and advantages of the invention will become apparent from a study of the following specification, taken in connection with the accompanying drawing wherein like characters of reference designate corresponding parts throughout the several views, and wherein.

Figure 1:
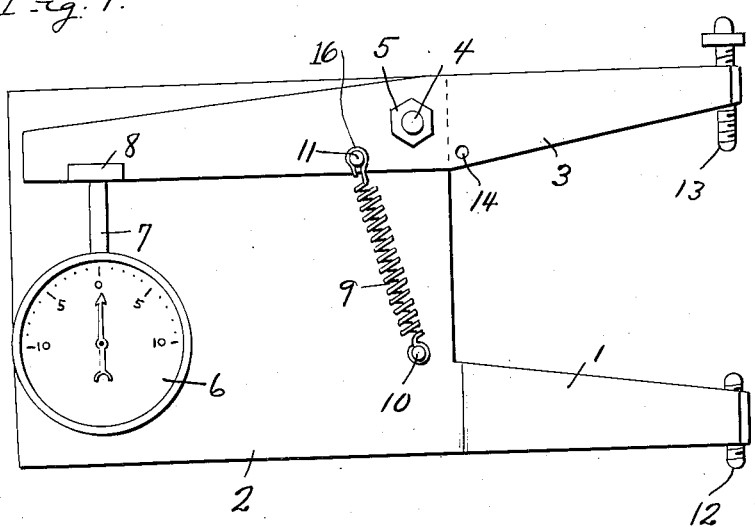
Figure 1 is a view in front elevation showing a gauge constructed in accordance with the present invention.
Figure 2:
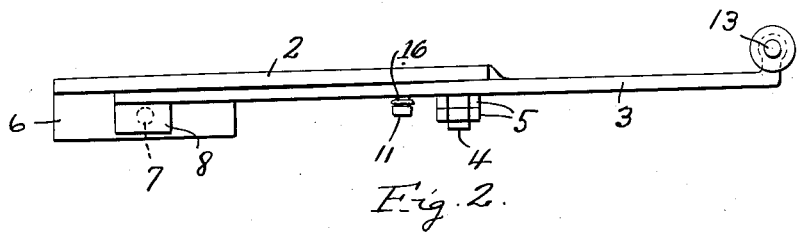
Figure 2 is a top plan view of the gauge.
Figure 3:
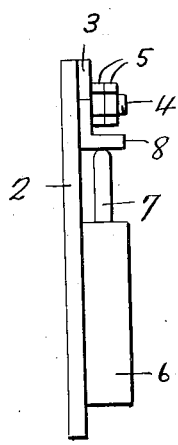
Figure 3 is a view in end elevation of the gauge.

Referring now to the drawing in detail, it will be seen that the embodiment of the present invention which has been illustrated comprises a stationary arm 1 which is formed integrally with a flat plate 2. The reference numeral 3 designates an adjustable arm which is pivotally mounted at an intermediate point on a pin 4 which projects from one side of plate 2 at a point remote from the stationary arm 1. Nuts 5 are threaded on the pin 4 for retaining the pivoted arm 3 on said pin.

Also mounted on the plate 2 is a conventional indicator 6 which includes a slidable actuating plunger 7. A lug or tongue 8 projects laterally from the adjacent end portion of the pivoted arm 3 and is engaged with the free end of the plunger 7. A coil spring 9 has one end anchored, as at 10, to the plate 2 and its other end formed with a hook 16 that is detachably engaged with the shank of pin 11. This pin 11 is anchored to pivoted arm 3 rearwardly of pivot 4 and when spring 9 is engaged with the pin, the outer or work engaging end of arm 3 is yieldingly urged outwardly for measuring inside diameters.

The arms 1 and 3 terminate in laterally extending outer end portions in which adjustable contact fingers 12 and 13, respectively, are mounted. The adjustable contact finger 13 is threadedly mounted to permit adjustment thereof. It will be noted that both ends of the contact fingers 12 and 13 project from the gauge arms, thus adapting the instrument for either inside or outside work. Toward this end, the pivoted arm 3 is provided with an opening 14 intermediate the pivot pin 4 and the contact finger 13 for the reception of the hook 16 for reversing the direction in which said arm 3 will be yieldingly urged by the coil spring 9. The hook 16 on coil spring 9 is engaged in the opening 14 when the instrument is to be used for outside work, as on crank shafts.

When used for measuring the inside diameters like vertical cylinders of internal combustion engines, plate 2 is laid flat on the upper face of the cylinder block with the indicator 6 facing upwardly. In this position the right angular extensions carrying the contact fingers 12 and 13 extend into the cylinders to the first piston ring travel and indicate the inside measurements without removing the hone with which the cylinders are being dressed. For measuring inside diameters the pointer on indicator 6 moves counter-clockwise, whereas it moves clockwise for outside diameters.

It is believed that the many advantages of a gauge constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

A gauge comprising a flat plate, a stationary arm formed integrally with the plate, a threaded pin projecting laterally from the plate at a point remote from the stationary arm, a movable arm journaled, at an intermediate point, on the pin, retaining nuts threaded on the pin for securing the movable arm thereon, said movable arm having attaching means therein on opposite sides of its pivot, a coil spring connected, at one end, to the plate, the other end of said spring being selectively engageable with said attaching means for operatively connecting the coil spring to the movable arm on opposite sides of the pivot of said movable arm for yieldingly urging the movable arm in either direction, an indicator mounted on the plate and including a slidable actuating plunger, a laterally projecting lug on the movable arm engaged with the plunger for operatively connecting said movable arm to the indicator, and work engaging fingers, free on opposite ends, mounted on the outer ends of the arms.

JOSEPH J. JAZWIECK.